G. A. STURROCK.
HAND SEED PLANTER.
APPLICATION FILED AUG. 30, 1917.
1,269,877.
Patented June 18, 1918.
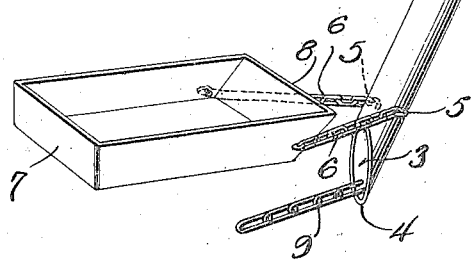
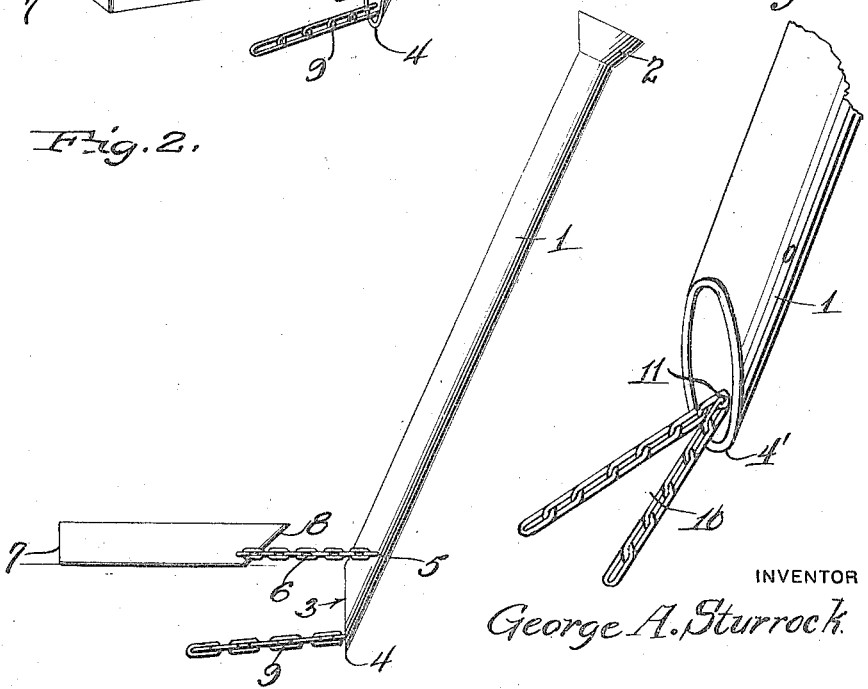
INVENTOR
George A. Sturrock
WITNESSES
ATTORTEY

UNITED STATES PATENT OFFICE.

GEORGE ALEXANDER STURROCK, OF PORT TOWNSEND, WASHINGTON, ASSIGNOR OF ONE-FOURTH TO R. E. HERRING AND GRACE G. HERRING, BOTH OF SAN FRANCISCO, CALIFORNIA.

HAND SEED-PLANTER.

1,269,877.      Specification of Letters Patent.      Patented June 18, 1918.

Application filed August 30, 1917. Serial No. 188,983.

*To all whom it may concern:*

Be it known that I, GEORGE A. STURROCK, a citizen of the United States, residing at Port Townsend, in the county of Jefferson and State of Washington, have invented certain new and useful Improvements in Hand Seed-Planters, of which the following is a specification.

This invention relates to planting devices and more particularly to a hand seed planter particularly adapted for use in small gardens where the use of the usual large and cumbersome seed drill is prohibited.

The primary object of the invention is to provide a seed distributing and covering device which may be held in the hands of the person using the same and operated to form a suitable furrow in which the seeds are received and properly covered.

The invention also aims at the provision of a device of this character having means for breaking up and evenly spreading small bunches or collected quantities of seeds which might be inadvertently distributed in the furrow.

The invention also aims to provide a device that will include an element for evenly spreading fertilizer when the same is being distributed in the furrows to be planted with seeds.

A further object of this invention is the provision of a hand seed planter which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which, Figure 1 is a perspective view of the invention constructed in accordance with my invention, Fig. 2 is a side elevation, Fig. 3 is a fragmentary detailed perspective view showing a modification of the device which includes the structure used for spreading fertilizer.

Referring to the drawing, wherein is illustrated the preferred form of my invention, and in which like numerals of reference indicate corresponding parts throughout the several views, a distributing tube 1 is constructed from a suitable length of metallic piping which may be of a diameter suitable to the conditions under which the device is operated. The upper end of the distributing tube is open and is flared outwardly to provide a funnel mouth 2, which, in addition to its function of providing a convenient opening for the reception of the seeds, acts as a stop member to prevent the hands of the operator from slipping off the tube.

The opposite lower end of the distributing tube is cut at an angle as shown to advantage in Fig. 2 of the drawing and when the device is in operative position this angularly cut end is disposed substantially vertically. The exit 3 for the seeds, therefore, faces directly rearwardly and the angularly cut end provides a point 4 which will form a furrow in the earth's surface when this end of the tube is dragged over the ground.

Near this exit, the tube is provided with ears or eyes 5 disposed opposite to each other and are connected to the ends of pull chains 6 the opposite terminals of which are fastened to a drag 7. This drag is in the form of a receptacle of rectangular box like formation with the exception of its forward end which is inclined forwardly to provide a buffer plate 8. The receptacle which forms the drag may be filled with sand for the purpose of weighting the drag although it will be obvious that stones or other heavy material may be substituted for the sand. The provision of a hollow receptacle of comparatively light weight will render the device inexpensive to manufacture in comparison to the cost of a weighted drag and also will lessen shipping charges when the devices are shipped from place to place. The width of the drag is greater than the width of the furrow so that it rests upon the earth's surface at opposite sides of the furrow and the buffer plate will push the earth forwardly and cover the seeds dropped in the furrow formed by the point 4. While I have shown the drag in a perfectly horizontal plane in Fig. 2 of the drawing it will be obvious that a shallow furrow will cause the drag to be in a correspondingly lower plane.

Near the point 5, I have attached a spreader 9 in the form of a flexible element constructed from chain or other suitable flexible material. This chain is adapted to drag in the bottom of the furrow and will break up small bunches or heaps of seeds inadvertently dropped in irregular quantities by the user of the device.

When in use, the operator will carry the seeds to be planted in a convenient pocket or bag suspended from his clothing and with his left hand will grasp the distributing tube at a point about twelve inches from the open flared end. In this connection it might be stated that the distributing tube should be approximately three and one-half feet long. With his right hand the operator takes a few seeds from the said supply and holds them between his thumb and forefinger while the other fingers of the right hand will be caught under the flared end and will act as a fulcrum so that the pressure may be applied by the left hand to cause the point 4 to embed itself in the earth's surface. The user then walks along in the desired direction and distributes the seeds into the funnel mouth which will continue through the distributing tube 1 and be ejected through the exit opening 3. The chain spreader 9 will act to break up the small heaps of seed which might fall in the furrow due to the uneven or irregular distribution by the user. The drag 7 will, of course, be weighted and the buffer plate will force the loose earth into the furrow and thereby cover the seeds.

In the modification shown in Fig. 3 of the drawing, wherein the means for using the device as a fertilizer spreader is illustrated, the distributing tube is provided with a double spreader chain 10 which consists of two lengths joined together by an eye bolt 11 near the point 4 of the tube. The two chain lengths should be of greater weight than is the spreader chain 9 in the above described form so that fertilizer dropped through the tube will be agitated by the chains and evenly spread. It will be obvious, of course, that the drag may be removed from the tube if desired for employing the device as a fertilizer spreader.

From the foregoing it will be observed that a very simple and durable hand seed planter has been provided, and the details of which embody the preferred form. I desire it to be understood, however, that slight changes in the minor details of construction may be made without departing from the spirit of the invention or the scope of the claims hereunto appended.

I claim—

1. A hand planter comprising an elongated tube adapted to extend from a point near the waist line of the user, to the ground, the lower end of the tube being cut at an angle to provide a point and a rearwardly disposed open end, a drag comprising a receptacle, and pull chains attached to the receptacle and to the said tube.

2. A hand planter comprising an elongated tube having one end cut at an angle to provide a point, and an open end, ears disposed on the tube near the said open end and provided with pull chains extending rearwardly, and a rectangular box attached to the said pull chains and having its forward end inclined to provide a buffer plate in spaced relation from the said open end of the tube.

In testimony whereof I affix my signature in presence of two witnesses.

GEORGE ALEXANDER STURROCK.

Witnesses:
 U. D. GNAGEY,
 C. R. CRONTERS.